United States Patent
Rufino et al.

(10) Patent No.: US 12,499,223 B2
(45) Date of Patent: Dec. 16, 2025

(54) PREVENTING USER INTERACTION HIJACKING ATTACKS BY BLOCKING INTERACTIONS WITH OBSCURED COMPONENTS

(71) Applicant: Google LLC, Mountain View, CA (US)

(72) Inventors: Bernardo Rufino, Waltham Cross (GB); Linus Tufvesson, London (GB); Edward Cunningham, London (GB); Alan Michael Stokes, London (GB)

(73) Assignee: GOOGLE LLC, Mountain View, CA (US)

( * ) Notice: Subject to any disclaimer, the term of this patent is extended or adjusted under 35 U.S.C. 154(b) by 299 days.

(21) Appl. No.: 18/273,025

(22) PCT Filed: Feb. 3, 2021

(86) PCT No.: PCT/US2021/016439
§ 371 (c)(1),
(2) Date: Jul. 18, 2023

(87) PCT Pub. No.: WO2022/169445
PCT Pub. Date: Aug. 11, 2022

(65) Prior Publication Data
US 2024/0086529 A1    Mar. 14, 2024

(51) Int. Cl.
*G06F 21/55* (2013.01)

(52) U.S. Cl.
CPC ...... *G06F 21/554* (2013.01); *G06F 2221/032* (2013.01)

(58) Field of Classification Search
CPC ... G06F 21/554; G06F 2221/032; G06F 3/048
See application file for complete search history.

(56) References Cited

U.S. PATENT DOCUMENTS

| 8,413,236 B1 * | 4/2013 | Hansen | H04L 63/1441 |
| | | | 726/22 |
| 9,760,256 B1 | 9/2017 | Weatherall et al. | |

(Continued)

FOREIGN PATENT DOCUMENTS

| CN | 106971123 | 7/2017 |
| WO | 2020066084 A1 | 4/2020 |

OTHER PUBLICATIONS

Alnitak, "What's the formula for the combined transparency of two overlaid transparent images" Jun. 17, 2011, Published on StackOverflow, https://stackoverflow.com/questions/6385755/whats-the-formula-for-the-combined-transparency-of-two-overlaid-transparent-ima (Year: 2011).*

(Continued)

*Primary Examiner* — Kee M Tung
*Assistant Examiner* — Thang Gia Huynh
(74) *Attorney, Agent, or Firm* — McDonnell Boehnen Hulbert & Berghoff LLP

(57) ABSTRACT

A method includes detecting a user interaction with a particular region of a graphical user interface (GUI), and determining that the user interaction will be consumed by a particular user interface (UI) component that is overlaid by a plurality of UI components configured to allow the user interaction to pass through to the particular UI component. The method also includes, based on determining that the user interaction will be consumed by the particular UI component, determining a cumulative opacity of the plurality of UI components at the particular region of the GUI. The method further includes determining that the cumulative opacity exceeds a threshold opacity and, based on determining that the cumulative opacity exceeds the threshold opacity, blocking the particular UI component from consuming the user interaction.

20 Claims, 7 Drawing Sheets

(56) References Cited

U.S. PATENT DOCUMENTS 10,867,035 B1    12/2020    Chauhan
2017/0257394 A1    9/2017    Hansen

OTHER PUBLICATIONS

Justinmind, "How to design fixed position elements in your interactive prototypes" Dec. 5, 2017 Published on Medium, https://medium.com/justinmind/how-to-design-fixed-position-elements-in-your-interactive-prototypes-ae8407c1767e (Year: 2017).*

Japanese Patent Office, Office Action mailed Oct. 1, 2024, issued in connection with Japanese Patent Application No. 2023547140, 3 pages.

Aljarrah et al., "Maintaining User Interface Integrity on Android," 2016 IEEE 40th Annual Computer Sotward and Applications Conference, Jun. 2016, pp. 449-458.

"Cloak and Dagger: From Two Permissions to Complete Control of the UI Feedback Loop," Cloak & Dagger, 2017, 12 pages.

International Searching Authority, International Search Report and Written Opinion, mailed on Oct. 20, 2021, issued in connection with International Patent Application No. PCT/US2021/016439, filed on Feb. 3, 2021, 12 pages.

Patil, Kailas, "Preventing Click Event Hijacking by User Intervention Inference," ICTACT Journal on Communication Technology, Dec. 2016, pp. 1408-1416, vol. 7, No. 4.

Rasthofer et al., "An Investigation of the Android/BadAccents Malware which Exploits a new Android Tapjacking Attack," Technical Report NR. TUD-CS-2015-0065, Technische Universitat Darmstadt, Apr. 1, 2015, 21 pages.

Wu et al., "Analysis of Clickjacking Attacks and An Effective Defense Scheme for Android Devices," 2016 IEEE Conference on Communications and Network Security (CNS), 2016, pp. 55-63.

* cited by examiner

PREVENTING USER INTERACTION HIJACKING ATTACKS BY BLOCKING INTERACTIONS WITH OBSCURED COMPONENTS

CROSS-REFERENCE TO RELATED APPLICATIONS

The present application is a National Stage Application under 35 U.S.C. § 371 and claims priority to International Patent Application No. PCT/US2021/016439, filed Feb. 3, 2021, and titled "Preventing User Interaction Hijacking Attacks By Blocking Interactions With Obscured Components," which is incorporated herein by reference in its entirety.

BACKGROUND

Malicious software may be configured to intentionally damage a computing resource, monitor usage of a computing resource, and/or obtain information about a user of the computing device, among other malicious functions. In some cases, malicious software may operate by exploiting known vulnerabilities of a computing device, its operating system, and/or the applications executing thereon. Accordingly, it is desirable to reduce and/or eliminate such vulnerabilities, preferably without affecting normal operation and/or functionality of the computing device, operating system, and/or software application.

SUMMARY

A user interaction hijacking attack may involve a user interaction being passed through to a particular user interface (UI) component that is obstructed by a plurality of UI components that overlays the particular UI component as part of a graphical user interface (GUI). The user interaction may be consumed by the particular UI component, rather than the overlaying plurality of UI components, because each respective UI component of the plurality of UI components may be associated with an attribute that configures the respective UI component to ignore the user interaction and thus allow it to pass through to underlying layers of the GUI. User interaction hijacking attacks may be reduced and/or eliminated by determining the cumulative opacity of the plurality of UI components at a region associated with the user interaction. When the cumulative opacity exceeds a threshold opacity, and the corresponding portion of the particular UI component is thus not sufficiently visible through the plurality of UI components, the user interaction may be blocked.

A first example embodiment involves a computer-implemented method that includes detecting a user interaction with a particular region of a GUI. The computer-implemented method also includes determining that the user interaction will be consumed by a particular UI component that is overlaid by a plurality of UI components configured to allow the user interaction to pass through to the particular UI component. The computer-implemented method additionally includes, based on determining that the user interaction will be consumed by the particular UI component, determining a cumulative opacity of the plurality of UI components at the particular region of the GUI. The computer-implemented method further includes determining that the cumulative opacity exceeds a threshold opacity and, based on determining that the cumulative opacity exceeds the threshold opacity, blocking the particular UI component from consuming the user interaction.

A second example embodiment involves a system that includes a processor, and a non-transitory computer-readable medium having stored thereon instructions that, when executed by the processor, cause the processor to perform operations. The operations include detecting a user interaction with a particular region of a GUI. The operations also include determining that the user interaction will be consumed by a particular UI component that is overlaid by a plurality of UI components configured to allow the user interaction to pass through to the particular UI component. The operations additionally include, based on determining that the user interaction will be consumed by the particular UI component, determining a cumulative opacity of the plurality of UI components at the particular region of the GUI. The operations further include determining that the cumulative opacity exceeds a threshold opacity and, based on determining that the cumulative opacity exceeds the threshold opacity, blocking the particular UI component from consuming the user interaction.

A third example embodiment involves an article of manufacture that includes a non-transitory computer-readable medium having stored thereon instructions that, when executed by a computing device, cause the computing device to perform operations. The operations include detecting a user interaction with a particular region of a GUI. The operations also include determining that the user interaction will be consumed by a particular UI component that is overlaid by a plurality of UI components configured to allow the user interaction to pass through to the particular UI component. The operations additionally include, based on determining that the user interaction will be consumed by the particular UI component, determining a cumulative opacity of the plurality of UI components at the particular region of the GUI. The operations further include determining that the cumulative opacity exceeds a threshold opacity and, based on determining that the cumulative opacity exceeds the threshold opacity, blocking the particular UI component from consuming the user interaction.

A fourth example embodiment involves a system that includes means for detecting a user interaction with a particular region of a GUI. The system also includes means for determining that the user interaction will be consumed by a particular UI component that is overlaid by a plurality of UI components configured to allow the user interaction to pass through to the particular UI component. The system additionally includes means for, based on determining that the user interaction will be consumed by the particular UI component, determining a cumulative opacity of the plurality of UI components at the particular region of the GUI. The system further includes means for determining that the cumulative opacity exceeds a threshold opacity and means for, based on determining that the cumulative opacity exceeds the threshold opacity, blocking the particular UI component from consuming the user interaction.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
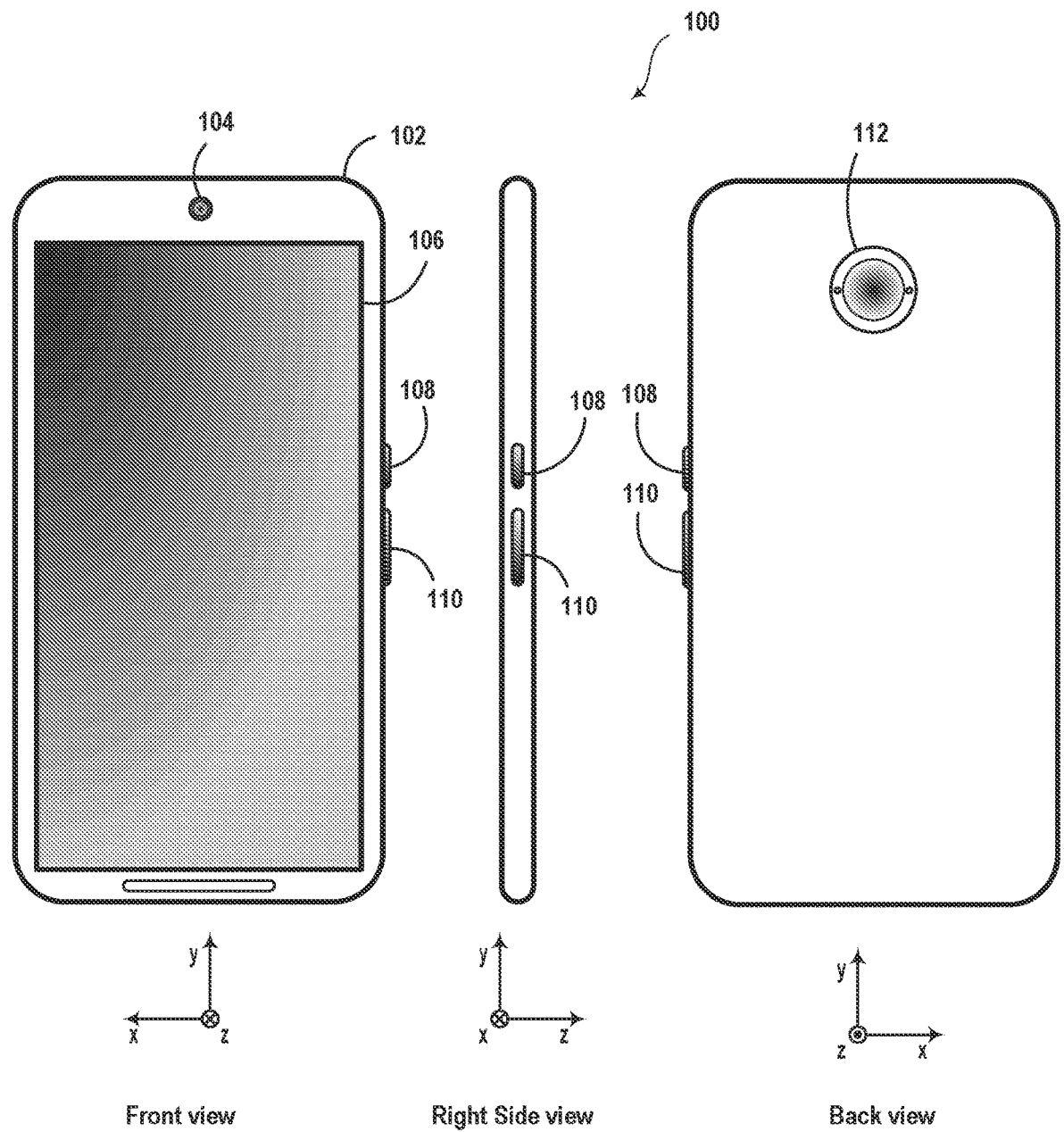
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A user interaction hijacking attack, such as tapjacking, may involve displaying a UI component that appears to be the target of a user interaction and that obstructs another UI component that actually ends up consuming the user interaction. The obstructing UI component may present seemingly non-malicious content that induces a user to interact with certain parts of a GUI, but these interactions may, without the user's awareness, be used to control and/or modify aspects of the obstructed UI component. Thus, for example, a malicious application may trick the user into granting to the malicious application permissions that the user might not otherwise grant to the malicious application, such as permission to use certain hardware of the computing device, monitor operations of other software applications, and/or execute certain system functions, among other possibilities. Additionally or alternatively, the malicious application may trick the user into hitting a pay button, taking a photo, and/or placing a call, among other possibilities. In this way, the malicious application may be able to operate in ways that have not been intended by the user.

The possibility of such user interaction hijacking attacks may arise from the capability of some computing devices and/or operating systems to provide overlapping and/or overlaying UI components, some of which may be configured to ignore the user interaction and pass it on down to underlying UI components. User interaction hijacking attacks may be especially problematic in cases where the UI components are not manually moveable and/or repositionable by the user, since this may prevent the user from noticing that the user's interactions are being misdirected. Since this capability to overlay UI components, some of which may ignore user interactions, may be desirable to achieve certain GUI effects and/or functions, eliminating this capability in order to prevent user interaction hijacking attacks is generally not a desirable solution.

Accordingly, in order to eliminate and/or reduce the likelihood of user interaction hijacking attacks, a computing device may be configured to block certain user interactions that pass through UI components that effectively obstruct a user's view of a UI component that will, if unblocked, consume the user interaction. When a particular UI component is overlaid by a single UI component, the opacity of the single UI component may be compared to a threshold opacity. The user interaction may be allowed to pass through to and be consumed by the particular UI component if the opacity is lower than or equal to the threshold opacity, and may be blocked otherwise. However, considering the obstruction of UI components individually, rather than in aggregate, may nevertheless allow for user interaction hijacking attacks. For example, two different UI components may each have a respective opacity that is lower than the threshold opacity. However, when these two different UI components are overlaid on top of one another (and on top of the particular UI component), the net effect due to stacking of the two UI components may nevertheless be an obstruction of the particular UI component.

Accordingly, rather than independently comparing the opacity of each UI component to the threshold opacity, the computing device may be configured to determine a cumulative opacity associated with a stack of a plurality of UI components that are configured to pass user interactions therethrough. Specifically, the opacity of each UI component may be associated with a corresponding transparency (e.g., the opacity and transparency may sum to a predetermined value, and may thus be viewed as complements). The cumulative opacity may be based on a product of the transparencies (scaled to the unit interval) associated with the plurality of UI components that overlay the particular UI component that will consume the user interaction. In some cases, since the opacity of a UI component may vary across the area thereof, the cumulative opacity may be determined for and/or based on the region at which the user interaction is directed (e.g., the region of the GUI that a user touched or clicked). Thus, the cumulative opacity may quantify the extent to which the region of the particular UI component is and/or could, under some circumstances, be visible to the user.

In some implementations, the cumulative opacity may be application-agnostic. Specifically, the cumulative opacity may be determined for the plurality of UI components regardless of whether each UI component of the plurality was generated by the same software application or different software application. The particular UI component may be allowed to consume the user interactions when the application-agnostic cumulative opacity indicates that the user is able to sufficiently clearly see (as judged by the threshold opacity) the relevant portion of the particular UI component, and the particular UI component may be blocked from consuming the user interaction when the user is not able to sufficiently clearly see the relevant portion of the particular UI component. Overlaying UI components generated by the same software application as the particular UI component that will consume the user interaction may, in some cases, be included as part of the application-agnostic cumulative opacity or, in other cases, may be excluded therefrom.

In other implementations, the cumulative opacity may be based on one or more application-specific cumulative opacities. For example, a first application-specific opacity may be determined based on a first plurality of UI components associated with a first software application, and a second application-specific opacity may be determined based on a second plurality of UI components associated with a second software application. The first software application and the second software application may be different from a third software application associated with the particular UI component expected to consume the user interaction. The cumulative opacity may be the higher of the first application-specific opacity or the second application-specific opacity. Thus, the application-specific cumulative opacity may quantify whether any single software application is capable of preventing a user from seeing, with sufficient clarity, a given region of the particular UI component, but multiple different software applications may independently stack their respective UI components in a way that may occlude the given region of the particular UI component.

In many cases, a computing device and/or an operating system thereof may enforce independent operation of these multiple software applications. Thus, a given software application is likely unaware of operations being performed by other software applications, and therefore cannot deterministically coordinate the display of its UI components with the UI components of other software applications. Accordingly, since malicious coordination between different software applications is unlikely, the application-specific cumulative opacity may still decrease and/or eliminate the possibility of user interaction hijacking while being less likely to interfere with non-malicious operations of a computing device.

In further implementations, some UI components may be excluded from the computation of the cumulative opacity. For example, UI components generated by the operating system and/or by an explicitly trusted software application might not contribute to the cumulative opacity, since these UI components may be considered to be trusted based on their source. Additionally, UI components with an opacity equal to zero may be excluded, since these UI components are perfectly see-through and thus do not influence the cumulative opacity. Other exceptions based on other indicia of trust are possible.

In some implementations, the monitoring of UI components, determination of the cumulative opacity, and/or the blocking of user interactions, among other operations discussed herein, may be performed by an operating system of the computing device. For example, these operations may be performed automatically, without involving an opt-in process and/or providing an opt-out process to software applications. By providing these operations automatically as part of the operating system, each software application executed by the operating system may be automatically protected from user interaction hijacking attacks. That is, the avoidance of user interaction hijacking attacks might not depend on each software application invoking these protections and/or other protections that may be provided by the operating system, resulting in a system that is secure by design.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a desktop computer, a laptop computer, a tablet computer, or a wearable computing device (e.g., a watch), among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may serve as a viewfinder for front-facing camera 104 and/or rear-facing camera 112. Display 106 may also support touchscreen functions that allow for interaction with aspects of computing device 100.

Computing device 100 may also include an ambient light sensor that may continuously or from time to time determine the ambient brightness of an environment in which computing device 100 is present. In some implementations, the ambient light sensor can be used to adjust the display brightness of display 106. Additionally, the ambient light sensor may be used to determine an exposure length of one or more of cameras 104 or 112, or to help in this determination.

Figure 2:
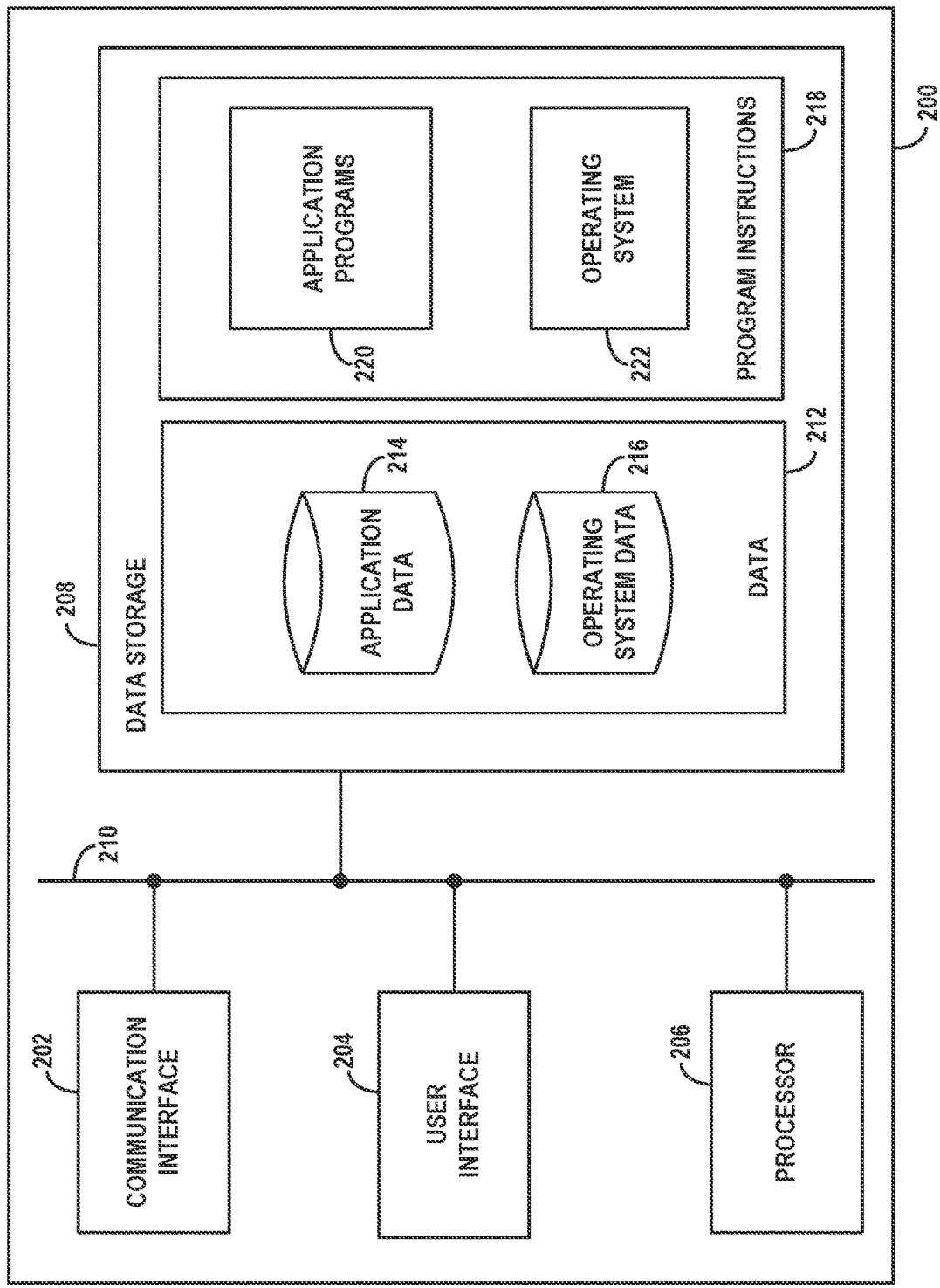
FIG. 2 illustrates a computing system, in accordance with example embodiments.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100. As shown in FIG. 2, computing system 200 may include communication interface 202, user interface 204, processor 206, and data storage 208, all of which may be communicatively linked together by a system bus, network, or other connection mechanism 210.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX, 3GPP Long-Term Evolution (LTE), and/or 3GPP 5G). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing and/or execution of machine learning models, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

III. EXAMPLE TAPJACKING ATTACKS

Figure 3:
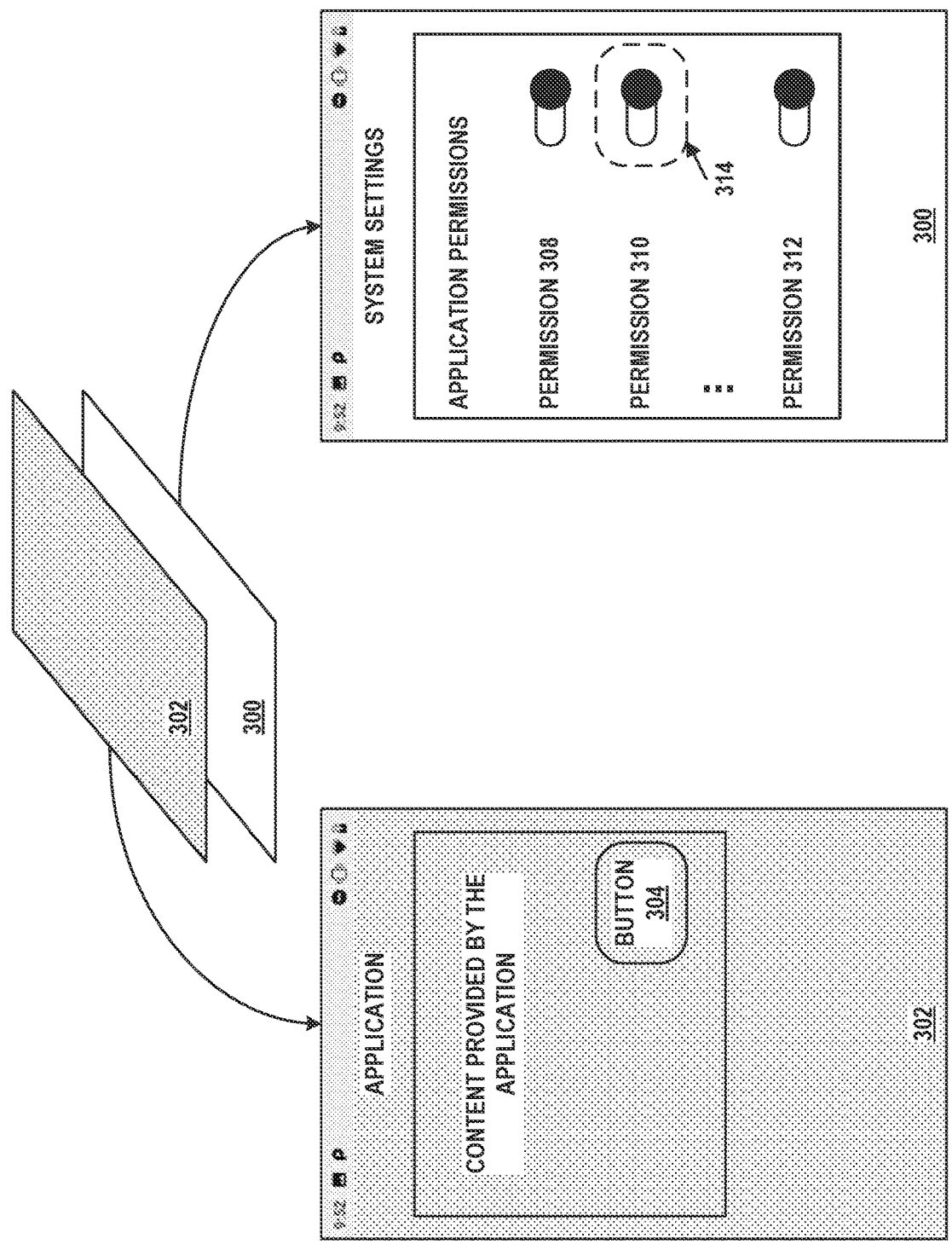
FIG. 3 illustrates aspects of a tapjacking attack, in accordance with example embodiments.

FIG. 3 illustrates an example tapjacking (short for tap hijacking) attack, which involves a malicious software application hijacking and misdirecting a user's touch input, thereby tricking the user into doing something the user did not intend. Tapjacking is used throughout this specification as an example of the general concept of user interaction hijacking. Thus, it is to be understood that the example techniques discussed herein are generally applicable in the context of GUIs, regardless of the specific modality of interaction with the GUI (e.g., tapping, clicking, pressing, eye gazing, etc.).

Specifically, as illustrated in FIG. 3, a tapjacking attack may involve a malicious application generating UI component 302 that overlays UI component 300 generated by another software application and/or the operating system. UI component 302 may be configured to pass user interactions through to underlying layers of the GUI. That is, UI component 302 may be configured to ignore user interactions, thereby allowing these interactions to pass through to UI component 300, where they are consumed. UI component 300 may be configured to consume the user interactions. Consumption of a user interaction by a given UI component may include the given UI component receiving the user interaction and responding to the user interaction (e.g., triggering performance of operations based on and/or in response to the user interaction). When the given UI component is configured to consume the user interaction, the user interaction interacts with, as opposed to passing through, the given UI component, and is thus not available for consumption by other UI components.

Additionally, UI component 302 may be opaque such that UI component 300 is not visible to the user. Accordingly, UI component 302 may act as a facade that blocks a user's view of UI component 300 with which the user is unknowingly interacting. Further, in some cases, the respective positions of UI components 300 and 302 may be fixed with respect to the GUI, and thus the user might not be able to move UI component 302 to reveal UI component 300.

In the example of FIG. 3, UI component 300 represents and provides for modification of permissions associated with the application that generated UI component 302. Specifically, UI component 300 includes and provides for modification of permission 308 and permission 310 through permission 312 (i.e., permissions 308-312), the granting of which may allow the application that generated UI component 302 to, for example, use hardware (e.g., camera, microphone, etc.) of the computing device executing the application, take screenshots using the computing device, monitor keyboard inputs received by the computing device, and/or invoke operating system functions, among other possibilities. In other cases, UI component 300 could instead provide for selection of a "pay" button, taking a photo, and/or placing an outgoing call, among other possibilities.

UI component 302 may provide content that appears non-malicious, and may thus induce the user to interact with button 304. Button 304 of UI component 302 overlays the toggle switch corresponding to permission 310, as indicated by box 314. Thus, since UI component 302 is configured to ignore user interactions, interaction with button 304 may actually result in granting of permission 310 to the application. Since the content of UI component 302 appears non-malicious and UI component 302 is opaque, the user may be tricked into interacting with button 304, which results in the granting of permission 310 to the application without the user's awareness.

The application may be configured to generate further content that appears non-malicious, is opaque to the user, and includes buttons that overlay other permissions of permissions 308-312, thereby secretly acquiring permissions that may allow the application to operate in ways not intended by the user. In other cases, rather than overlaying UI component 300, UI component 302 may instead overlay other UI components that display and provide for modification of other system settings and/or other UI components provided by other software applications. Thus, the application that generated UI component 302 may trick the user into configuring other system settings and/or operating other software applications in ways not intended by the user.

IV. EXAMPLE SYSTEMS AND OPERATIONS FOR BLOCKING OF TAPJACKING ATTACKS

Figure 4:
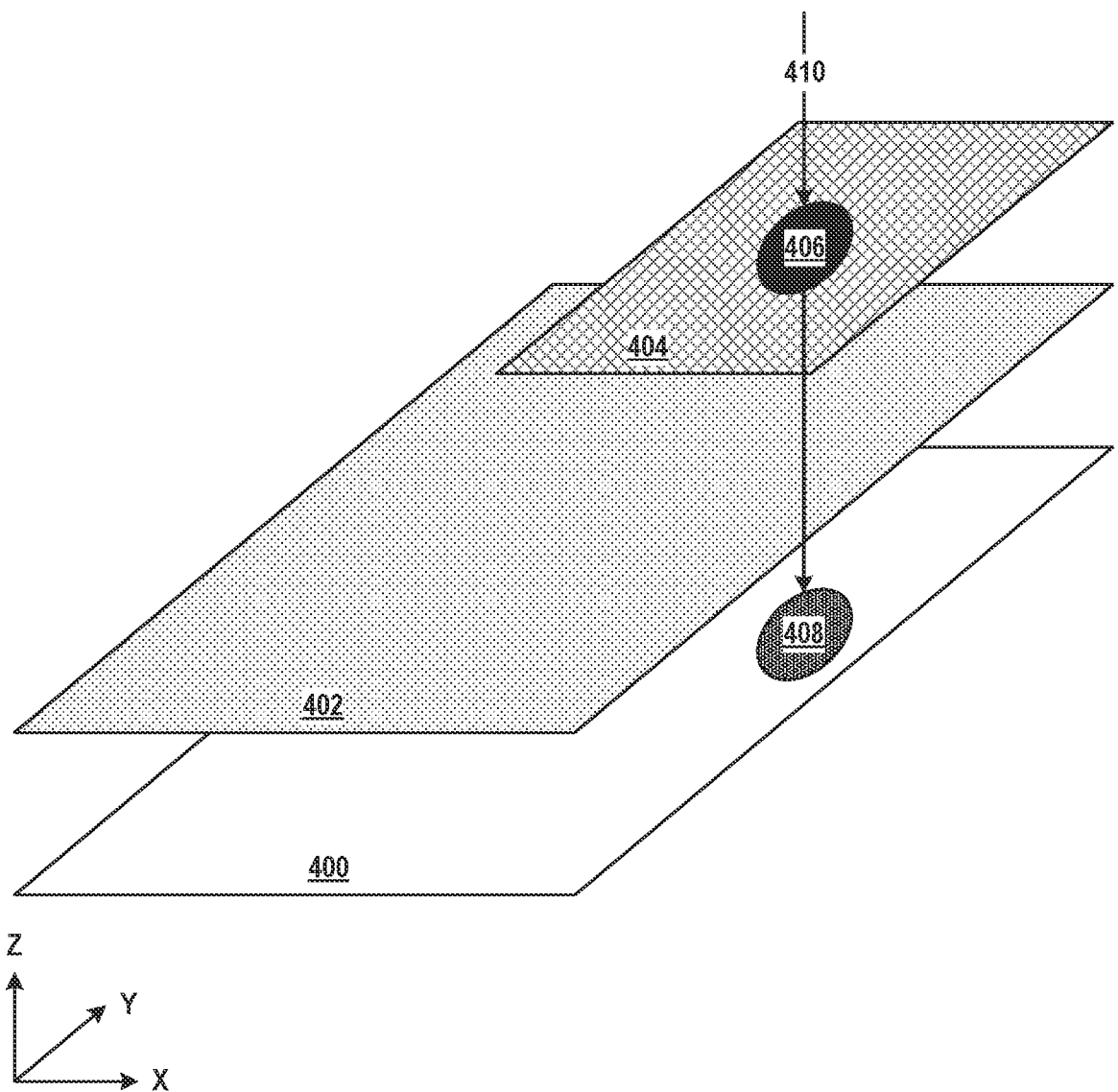
FIG. 4 illustrates an arrangement of components of a graphical user interface, in accordance with example embodiments.

FIG. 4 illustrates an example scenario related to blocking of tapjacking attacks, where a plurality of UI components configured to ignore, or pass through (rather than consume), a user interaction are overlaid on top of a UI component configured to consume (e.g., receive and react to) the user interaction. Specifically, FIG. 4 illustrates UI components 400, 402, and 404, as well as user interaction 410. UI components 400, 402, and 404, as well as any other UI components discussed herein, may include and/or take the form of a system alert window, an overlay, a toast, a dialog box, a card, a form, a notification, a sidebar, and/or any other UI construct or element capable of being displayed as part of a multi-layer GUI.

UI component 404 overlays UI component 402, which overlays UI component 400. Each respective UI component of UI components 404 and 402 may be associated with an attribute that configures the respective UI component to ignore user interactions, thus allowing user interaction 410 to pass through to UI component 400. Accordingly, although user interaction 410 appears (e.g., to a user) to be directed at UI component 404, as indicated by region 406, the user interaction is actually consumed by UI component 400, as indicated by region 408.

In cases where UI component 400 is overlaid by only a single UI component (e.g., UI component 404 only), tapjacking attacks may be avoided by having the computing device that provides the GUI allow user interactions to pass through to UI component 400 when an opacity of UI component 404 is below a threshold opacity, and block UI component 400 from consuming user interactions when the opacity of UI component 404 meets or exceeds the threshold opacity. That is, a user may be allowed to interact with UI component 400, while it is overlaid by UI component 404, when the user can sufficiently clearly see UI component 400 through UI component 404. The opacity of a UI component (e.g., UI component 404) may represent, for example, the extent and/or degree of blocking by the UI component of a visual signal originating from another underlying UI component (e.g., UI component 400).

However, an approach that considers UI components individually may allow for stacking of a plurality of UI components, each of which may have an opacity below the threshold opacity, to effectively obstruct the user's view of the UI component that will consume the user interaction. Accordingly, the computing device may be configured to determine whether to block or allow consumption of a user interaction by a particular UI component based on the cumulative opacity of UI components overlaying the particular UI component. Thus, in the scenario illustrated in FIG. 4, the computing device may be configured to determine the cumulative opacity of UI components 404 and 402. When the cumulative opacity of UI components 404 and 402 meets or exceeds the threshold opacity, user interaction 410 may be blocked from consumption by UI component 400. When the cumulative opacity of UI components 404 and 402 is below the threshold opacity, consumption of user interaction 410 by UI component 400 may be allowed.

In one example, the cumulative opacity may be computed according to the following formula: $\theta_Z = 1 - \Pi_{i \in I}(1 - o_i)$, where $\theta_Z$ represents the cumulative opacity with respect to UI component Z, I represents the set of UI components overlaying UI component Z, and $o_i$ (ranging from zero to one) represents the opacity of ith UI component in the set I (which does not include UI component Z). The cumulative opacity $\theta_Z$ with respect to UI component Z is based on UI components $i \in I$ overlaying UI component Z, but is not based on the opacity of UI component Z itself, since the opacity of UI component Z does not affect how extensively UI component Z is occluded by UI components above it. The cumulative opacity of plurality of UI components (e.g., UI component 402 and 404) may represent, for example, the combined extent and/or degree of blocking by the plurality of UI components of a visual signal originating from another underlying UI component (e.g., UI component 400).

Thus, in the example shown in FIG. 4, the cumulative opacity may be expressed as $\theta_{400} = 1 - ((1 - o_{402})(1 - o_{404}))$. For example, if UI components 404 and 402 each have an opacity of 0.7, the cumulative opacity may be equal to $(1 - (1 - 0.7)(1 - 0.7)) = 0.91$. Accordingly, if the threshold opacity is 0.8, then each of UI components 404 and 402 is, individually, below the threshold, but the cumulative opacity of UI components 404 and 402 exceeds the threshold. Thus, relying on the cumulative opacity may prevent a malicious application from passing user interaction 410 through to UI component 400 when UI components 404 and 402 are stacked on top of one another and effectively block a user's view of UI component 400.

The opacity of a given UI component and the transparency of the given UI components may be complements. That is, the opacity of the given UI component and the transparency of the given UI component may sum to a predetermined value (e.g., 1 or 255), and may thus be interchangeable. Specifically, $\lambda = o_i + t_i$, where $\lambda$ represents the predetermined value (e.g., $\lambda = 1$ in the example discussed above) and $t_i$ represents the transparency of the ith UI component. Thus, opacity of the ith UI component may be represented explicitly using $o_i$ or implicitly using $t_i$ depending, for example, on how attributes of the GUI are represented by the computing device, operating system, and/or software application(s).

Accordingly, a maximum opacity (corresponding to a minimum transparency) may be expressed as $o_i = \lambda$, a minimum opacity (corresponding to a maximum transparency) may be expressed as $o_i = 0$, a maximum transparency may be expressed as $t_i = \lambda$, and a minimum transparency may be expressed as $t_i = 0$. Thus, the transparency of a UI component may represent, for example, the extent and/or degree of transmission by the UI component of a visual signal originating from another underlying UI component. The cumulative transparency of plurality of UI components may represent, for example, the combined extent and/or degree of transmission by the plurality of UI components of a visual signal originating from another underlying UI component.

The equation $\theta_Z = 1 - \Pi_{i \in J}(1 - o_i)$ discussed above (where $\lambda = 1$) may alternatively be expressed as (i) $\theta_Z = \lambda - \lambda \Pi_{i \in J}((\lambda - o_i)/\lambda)$, (ii) $\theta_Z = \lambda - \lambda \Pi_{i \in J}(t_i/\lambda)$, (iii) $T_Z = \lambda \Pi_{i \in J}((\lambda - o_i)/\lambda)$, or (iv) $T_Z = \lambda \Pi_{i \in J}(t_i/\lambda)$, where $T_Z$ represents the cumulative transparency, where $\lambda = T_Z + \theta_Z$, and where $\lambda > 0$. That is, the cumulative opacity may be based on a product of transparencies of each respective UI component overlaying UI component Z, as expressed by $\lambda \Pi_{i \in J}((\lambda - o_i)/\lambda)$ or $\lambda \Pi_{i \in J}(t_i/\lambda)$. The cumulative opacity may be expressed explicitly based on a difference between the predetermined value and the product as in (i) or (ii), or implicitly using the cumulative transparency as in (iii) or (iv).

Similarly, the threshold opacity $\theta_{THRESHOLD}$ may be expressed according to $\lambda = \theta_{THRESHOLD} + T_{THRESHOLD}$. Accordingly, consumption of a user interaction by UI component Z may be allowed when the cumulative opacity is equal to or below the threshold opacity (i.e., $\theta_Z \leq \theta_{THRESHOLD}$) or when the cumulative transparency is greater than or equal to the threshold transparency (i.e., $T_Z \geq T_{THRESHOLD}$). Consumption of the user interaction by UI component Z may be blocked when the cumulative opacity is greater than the threshold opacity (i.e., $\theta_Z > \theta_{THRESHOLD}$) or when the cumulative transparency below the threshold transparency (i.e., $T_Z < T_{THRESHOLD}$).

In some cases, the determination of the cumulative opacity may be specific to the region of the GUI at which user interaction 410 is directed. Thus, in the example of FIG. 4, the cumulative opacity may be determined based on the respective opacity of (i) region 406 of UI component 404 and (ii) a region of UI component 402 corresponding to region 406. In cases where a given region is associated with more than one opacity value (e.g., for different portions thereof), the highest opacity (or lowest transparency) may be used in determining the cumulative opacity. Accordingly, if user interaction 410 were provided lower along the y axis of FIG. 4 such that it is outside of the area of UI component 404, then the cumulative opacity might be based on UI component 402, but not UI component 404. Considering the opacity of the specific region at which the interaction is directed, rather than, for example, a maximum opacity of a given UI component as a whole, may allow user interactions to be blocked less frequently in some non-malicious circumstances.

The size of the specific region used in determining the cumulative opacity may be selected based on consideration of (i) frequency of user interaction blocking in non-malicious cases and/or (ii) success rate in blocking malicious attacks. The size of the specific region may be based on the position of the user interaction (e.g., center, centroid, etc.), the size and/or area of the user interaction (e.g., the area covered by a user's touch input), and/or a buffer zone provided around the position and/or area of the user interaction. In one example, the size of the specific region may be equal to the area of the user interaction plus a buffer zone defined by adding a predetermined number of pixels at all points along a perimeter of the area of the user interaction. In cases where the determination of the cumulative opacity is not specific to the region of the GUI at which user interaction 410 is directed, and is instead based on the opacity of a respective UI component as a whole, the highest opacity (or lowest transparency) of the respective UI component may be used in determining the cumulative opacity.

In some implementations, the cumulative opacity may be application-agnostic. That is, a single cumulative opacity may be determined with respect to UI component 400 regardless of whether UI components 402 and 404 were generated by the same software application or different software applications. Using such an application-agnostic cumulative opacity may allow the user to see, with sufficient clarity, the contents of UI component 400 (at least in region 408) when user interaction 410 is allowed to pass through to and be consumed by UI component 400. Accordingly, when the contents of UI component 400 (at least in region 408) are not sufficiently visible to the user (as determined by comparing the application-agnostic cumulative opacity to the threshold opacity), user interaction 410 may be blocked from passing through to and being consumed by UI component 400.

Notably, in some cases, a given UI component (e.g., 402) may be excluded from a cumulative opacity calculation if the given UI component was generated by the same application as the UI component (e.g., 400) configured to consume the user interaction. This may be the case because a software application is unlikely to generate UI components with the intention of occluding or contributing to the occlusion of its own content. Thus, the application-agnostic cumulative opacity may be indifferent to the relationships among the overlaying UI components (e.g., the applications that cause these UI components to be generated), but may nevertheless consider how the underlying UI component that consumes the user interaction relates to the overlaying UI components.

Figure 5:
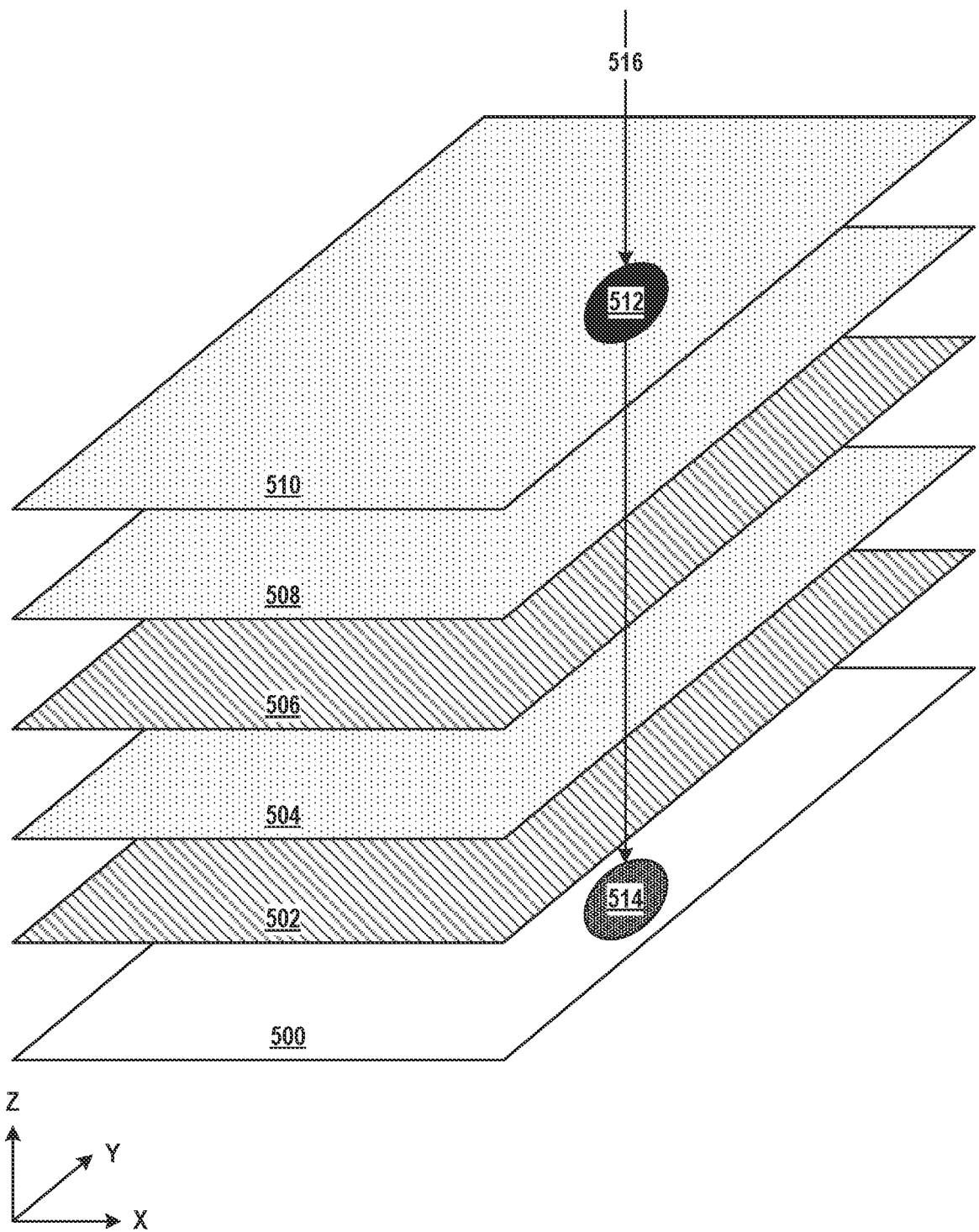
FIG. 5 illustrates an arrangement of components of a graphical user interface, in accordance with example embodiments.

FIG. 5 illustrates another example scenario related to blocking of tapjacking attacks, where a plurality of UI components configured to ignore, or pass through, a user interaction are overlaid on top of a UI component configured to consume the user interaction. Specifically, FIG. 5 illustrates a first plurality of UI components, including UI components 502 and 502 (indicated with a slanted line pattern), that have been generated by a first software application, and a second plurality of UI components, including UI components 504, 508, and 510 (indicated with a dotted pattern), that have been generated by a second software application different from the first software application. User interaction 516, which appears to be intended for region 512 of UI component 510, may actually be passed through to UI component 500, as indicated by region 514. Since the first and second software applications may be configured to operate independently of one another, and each application might be unaware of the other application's activities, it is unlikely that these two applications would collaborate in performing malicious activities.

Accordingly, in some cases, the cumulative opacity may be determined in an application-specific manner. That is, a first application-specific cumulative opacity may be determined for the first software application based on UI components 502 and 506 and a second application-specific cumulative opacity may be determined for the second software application based on UI components 504, 508, and 510. An overall cumulative opacity may be based on the first application-specific cumulative opacity and/or the second application-specific cumulative opacity. For example, the overall cumulative opacity may be expressed as (i) $\theta_Z = \max_{u \in \{uids\}}(\lambda - \lambda\Pi_{i \in I_u}((\lambda - o_i)/\lambda))$, (ii) $\theta_Z = \max_{u \in \{uids\}}(\lambda - \lambda\Pi_{i \in I_u}(t_i/\lambda))$, (iii) $T_Z = \min_{u \in \{uids\}}(\lambda\Pi_{i \in I_u}((\lambda - o_i)/\lambda))$, and/or (iv) $T_Z = \min_{u \in \{uids\}}(\lambda\Pi_{i \in I_u}(t_i/\lambda))$, where u represents the identifier of a particular software application of the set {uids}, which represents respective identifiers of a plurality of software applications with UI components overlaying UI component Z. That is, the overall cumulative opacity may be based on (i) a maximum application-specific opacity of a plurality of application-specific cumulative opacities associated with the plurality of software applications and/or (ii) a minimum application-specific transparency of a plurality of application-specific cumulative transparencies associated with the plurality of software applications.

In the example of FIG. 5, the overall cumulative opacity may be evaluated according to (i) $\theta_{500} = \max\{\lambda - \lambda((\lambda - o_{502})/\lambda)((\lambda - o_{506})/\lambda), \lambda - \lambda((\lambda - o_{504})/\lambda)((\lambda - o_{508})/\lambda)((\lambda - o_{510})/\lambda)\}$, (ii) $\theta_{500} = \max\{\lambda - \lambda(t_{502}/\lambda)(t_{506}/\lambda), \lambda - \lambda(t_{504}/\lambda)(t_{508}/\lambda)(t_{510}/\lambda)\}$, (iii) $T_{500} = \min\{\lambda((\lambda - o_{502})/\lambda)((\lambda - o_{506})/\lambda), \lambda((\lambda - o_{504})/\lambda)((\lambda - o_{508})/\lambda)((\lambda - o_{510})/\lambda)\}$, and/or (iv) $T_{500} = \min\{\lambda(t_{502}/\lambda)(t_{506}/\lambda), \lambda(t_{504}/\lambda)(t_{508}/\lambda)(t_{510}/\lambda)\}$. Accordingly, user interaction 516 may be blocked from consumption by UI component 500 when a maximum of (i) the application-specific cumulative opacity of UI components 502 and 506 and/or (ii) the application-specific cumulative opacity of UI components 504, 508, and 510 exceeds the threshold opacity.

In some cases, this arrangement may result in the user not being able to see (e.g., with sufficient clarity and/or at all) region 514 of UI component 500 corresponding to user interaction 516 when consumption of user interaction 516 by UI component 500 is permitted. Nevertheless, this occlusion of region 514 is likely to be the result of coincidental, non-malicious, and/or non-coordinated operation of at least two different software applications, none of which is the sole, independent cause of the occlusion.

Specifically, exploitation of the operation of a non-malicious application by a malicious application might involve the malicious software application determining what the non-malicious application is doing. For example, the malicious software application might attempt to determine whether the non-malicious application is displaying UI components that, if combined with additional malicious UI components, would completely occlude a UI component sought to be attacked. However, absent special permissions (which generally are not granted by default), many computing devices and/or operating systems do not allow software applications to monitor each other's execution and/or operations. Thus, the malicious application likely would not be able to monitor the operations of other applications, and would therefore not be able to exploit the independent operations of non-malicious software applications.

Further collusion between two malicious applications might involve the user installing the two malicious applications, and/or granting permissions to a first of the malicious applications that would then allow it to install additional malicious applications. Installation, by a user, of two malicious applications configured to cooperate with one another is unlikely. Additionally, operating systems provide safeguards (e.g., permission dialogs) against applications being granted permission to install other applications. Thus, installation of additional malicious applications by the first malicious application is also unlikely, and the likelihood is further reduced by the techniques discussed herein.

Accordingly, the computing device may consider coincidental and/or non-coordinated occlusions to be safe, and thus allow user interaction 516 to pass through to and be consumed by UI component 500 as long as no single application generates UI components that exceed the threshold opacity. Using application-specific cumulative opacities, rather than application-agnostic cumulative opacities, may reduce the number of user interactions blocked in response to non-malicious occlusions. Thus, the application-specific cumulative opacity may offer more flexibility without significant sacrifices, if any, in security of the computing device.

For example, a non-malicious software application may be configured to change a color scheme of the GUI (e.g., in order to control the wavelength of light emitted by the GUI) by displaying a colored and transparent UI component over the entire area of the GUI. Under the application-agnostic computation of the cumulative opacity, this non-malicious application would effectively reduce the extent to which other software applications can occlude a given UI component before it is blocked from receiving user input. On the other hand, under the application-specific computation of the cumulative opacity, this non-malicious application would have no effect on the extent to which other software applications can occlude the given UI component before it is blocked from receiving user input.

In some cases, both the application-specific cumulative opacity and the application-agnostic cumulative opacity may be computed and used concurrently. For example, the response to the application-specific cumulative opacity exceeding the threshold opacity may involve blocking consumption of the user interaction, while the response to the application-agnostic cumulative opacity exceeding the threshold opacity may involve displaying a prompt. The prompt may (i) indicate that the user interaction will be consumed by a UI component that is not sufficiently visible to the user and (ii) explicitly ask for permission to allow the user interaction to be consumed. Such an approach may provide both increased security and the flexibility to allow user interactions to pass through to completely obscured UI components under some circumstances.

Figure 6:
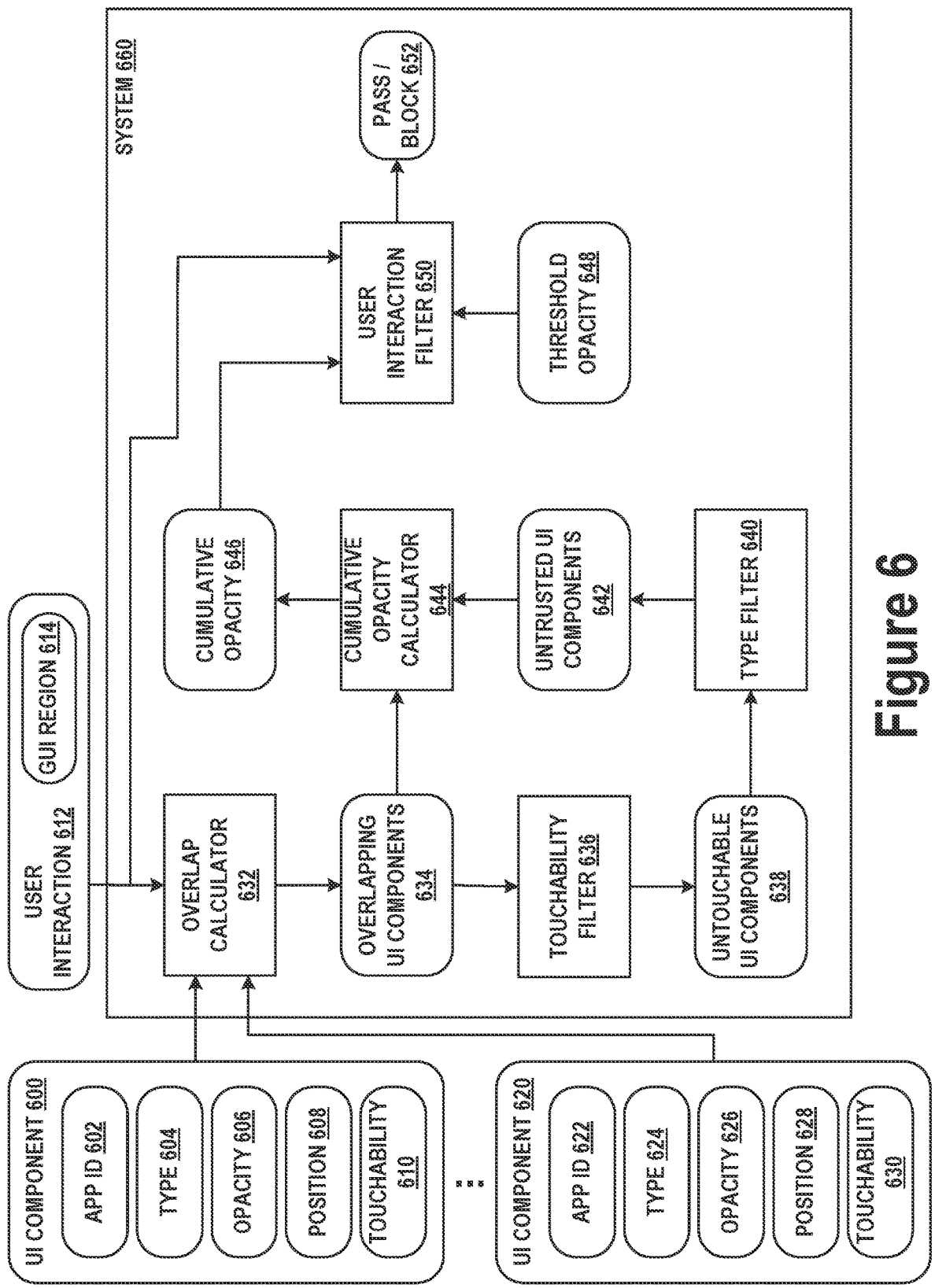
FIG. 6 illustrates a system for preventing tapjacking attacks, in accordance with example embodiments.

FIG. 6 illustrates an example system configured to filter user interactions on the basis of UI component opacity. Specifically, system 660 includes overlap calculator 632, touchability filter 636, type filter 640, cumulative opacity calculator 644, and user interaction filter 650. System 660 may form part of an operating system (e.g., operating system 222) of a computing device, and/or may be a stand-alone component provided as part of the computing device. Components of system 660 may be implemented as hardware, software, and/or a combination thereof forming part of computing device 100 and/or computing system 200. In some implementations, the order of operations of overlap calculator 632, touchability filter 636, and/or type filter 640 may be different than shown.

System 660 may be configured to receive as input attributes that define and/or are associated with UI component 600 through UI component 620 (i.e., UI components 600-620), and attributes that define and/or are associated with user interaction 612. Based on these attributes, system 660 may be configured to determine whether user interaction 612 is passed or blocked, as indicated by box 652, to a UI component configured to consume the user interaction.

UI component 600 may be associated with application identifier 602, type 604, opacity 606, position 608, and touchability 610, among other possible attributes. Application identifier 602 may indicate a software application that generated and/or requested the generation of UI component 600. Type 604 may be one of a predetermined number of possible types, or classes, of UI component 600. Opacity 606 may include one or more opacities (which may be expressed in terms of transparencies) corresponding to different regions of UI component 600. The opacity of a given region may represent a highest opacity present in the region (i.e., some parts of the region may have lower opacities), or a corresponding lowest transparency present in the region (i.e., some parts of the region may have higher transparencies).

Position 608 may include a vertical position (e.g., along the z-axis shown in FIGS. 4 and 5) of UI component 600 and/or a horizontal area (e.g., along the x-y plane shown in FIGS. 4 and 5) of UI component 600. Touchability 610 may indicate whether UI component 600 is configured to consume user interactions, or ignore user interactions and thus pass them through to underlying layers (e.g., layers with a lower z-axis value). Similarly, UI component 620 may be associated with application identifier 622, type 624, opacity 626, position 628, and touchability 630, among other possibilities.

User interaction 612 may be associated with GUI region 614 spanned by user interaction 612. For example, GUI region 614 may be a subset of the x-y plane, as shown in FIGS. 4 and 5, and may be determined based on a user touching, clicking, and/or otherwise interacting with the GUI. For example, GUI region 614 may correspond to region 406 and/or region 408 of FIG. 4, and/or region 512 and/or region 514 of FIG. 5.

Overlap calculator 632 may be configured to identify overlapping UI components 634 based on UI components 600-620 and user interaction 612. Specifically, overlapping UI components 634 may include a subset of UI components 600-620, where each UI component of this subset is associated with a horizontal area that overlaps with GUI region 614. For example, overlap calculator 632 may be configured to determine whether UI component 600 overlaps with GUI region 614 based on a horizontal component of position 608. Overlapping UI components 634 may include UI components configured to ignore user interaction 612 and UI components configured to consume user interaction 612. Overlapping UI components 634 might not include UI components with which user interaction 612 does not coincide and/or overlap, and thus might not need to be considered as part of the cumulative opacity calculation.

Touchability filter 636 may be configured to determine untouchable UI components 638 based on overlapping UI components 634 and the attributes thereof. Specifically, untouchable UI components 638 may include a subset of overlapping UI components 634, where each UI component of this subset is configured to ignore, pass-through, and/or otherwise not consume user interaction 612. For example, touchability filter 636 may be configured to determine whether UI component 600 is touchable based on touchability 610.

Type filter 640 may be configured to determine untrusted UI components 642 based on untouchable UI components 638 and the attributes thereof. Specifically, untrusted UI components 642 may include a subset of untouchable UI components 638, where each UI component of this subset is of a type that is classified as untrusted. For example, type filter 640 may be configured to determine whether UI component 600 is untrusted based on type 604.

Type 604 may take on a plurality of different predefined values. Some of these values may be classified as and/or considered to be trusted, while others may be classified as and/or considered to be untrusted. For example, UI components generated by an operating system may be associated with a first type that is classified as trusted, and thus might not need to be considered as part of the cumulative opacity calculation. In another example, UI components generated by a software application that has been explicitly granted heightened permissions (e.g., by the user or operating system) may be associated with a second type that is classified as trusted, and thus might not need to be considered as part of the cumulative opacity calculation. On the other hand, UI components generated by a software application that has not been explicitly granted heightened permissions may be associated with a third type that is classified as untrusted, and thus may be considered as part of the cumulative opacity calculation.

Cumulative opacity calculator 644 may be configured to determine cumulative opacity 646 based on untrusted UI components 642, overlapping UI components 634, and the attributes thereof. Specifically, cumulative opacity calculator 644 may be configured to select, based on overlapping UI components 634, at least one UI component configured to consume user interaction 612. Since overlapping UI components 634 depend on GUI region 614 associated with user interaction 612, the at least one UI component configured to consume user interaction 612 is also based on GUI region 614. For example, cumulative opacity calculator 644 may be configured to select, from overlapping UI components 634, a topmost UI component that is (i) touchable, and thus configured to consume user interaction 612 (which will be ignored by all overlaying UI components), and (ii) associated with a different application identifier than at least one of untrusted UI components 642 (since a given application is unlikely to attempt to attack itself).

In the case of UI component 600, cumulative opacity calculator 644 may be configured to determine whether UI component 600 is the topmost touchable component based on position 608 and touchability 610. Cumulative opacity calculator 644 may be configured to determine whether the application identifier of UI component 600 differs from at least one other application identifier of untrusted UI components 642 based on application identifier 602 and corresponding application identifiers of untrusted UI components 642. In some cases, selection of the topmost touchable component may instead be performed by touchability filter 636.

Cumulative opacity calculator 644 may be configured to determine cumulative opacity 646 with respect to the topmost touchable UI component using any of the techniques discussed herein. Specifically, cumulative opacity calculator 644 may be configured to determine cumulative opacity 646 with respect to the topmost touchable UI component based on a subset of untrusted UI components 642, where each UI component of this subset has a different application identifier than the application identifier of the topmost touchable UI components.

In one example, untrusted UI components 642 may include UI components 404 and 402 of FIG. 4, and cumulative opacity 646 may be an application-agnostic opacity. In another example, untrusted UI components 642 may include UI components 502, 504, 506, 508, and 510 of FIG. 5, and cumulative opacity 646 may be an application-specific opacity.

User interaction filter 650 may be configured to determine whether to pass or block user interaction 612 based on cumulative opacity 646 and threshold opacity 648, each of which may be expressed in terms of opacity and/or transparency. Specifically, user interaction filter 650 may be configured to block user interaction 612 when cumulative opacity 646 exceeds threshold opacity 648 (or when a corresponding cumulative transparency is below a corresponding threshold transparency). In some implementations, based on and/or in response to user interaction filter 650 blocking user interaction 612, system 660 may be configured to additionally or alternatively take other protective actions. For example, system 660 may generate a prompt indicating that user interaction 612 has been blocked, and/or asking whether to discard user interaction 612 or allow it to be consumed.

In some implementations, system 660 may be configured to track a frequency with which a given software application generates UI components that result in and/or contribute to blocked user interactions. These tracked frequencies may be aggregated across multiple devices (e.g., by an application store operator) and used to identify one or more applications that, more frequently than other applications, generate UI components that result in and/or contribute to the blocking of user interactions. Thus, when used across multiple computing devices, data generated by system 660 may additionally be used to identify potentially malicious software applications.

V. ADDITIONAL EXAMPLE OPERATIONS

Figure 7:
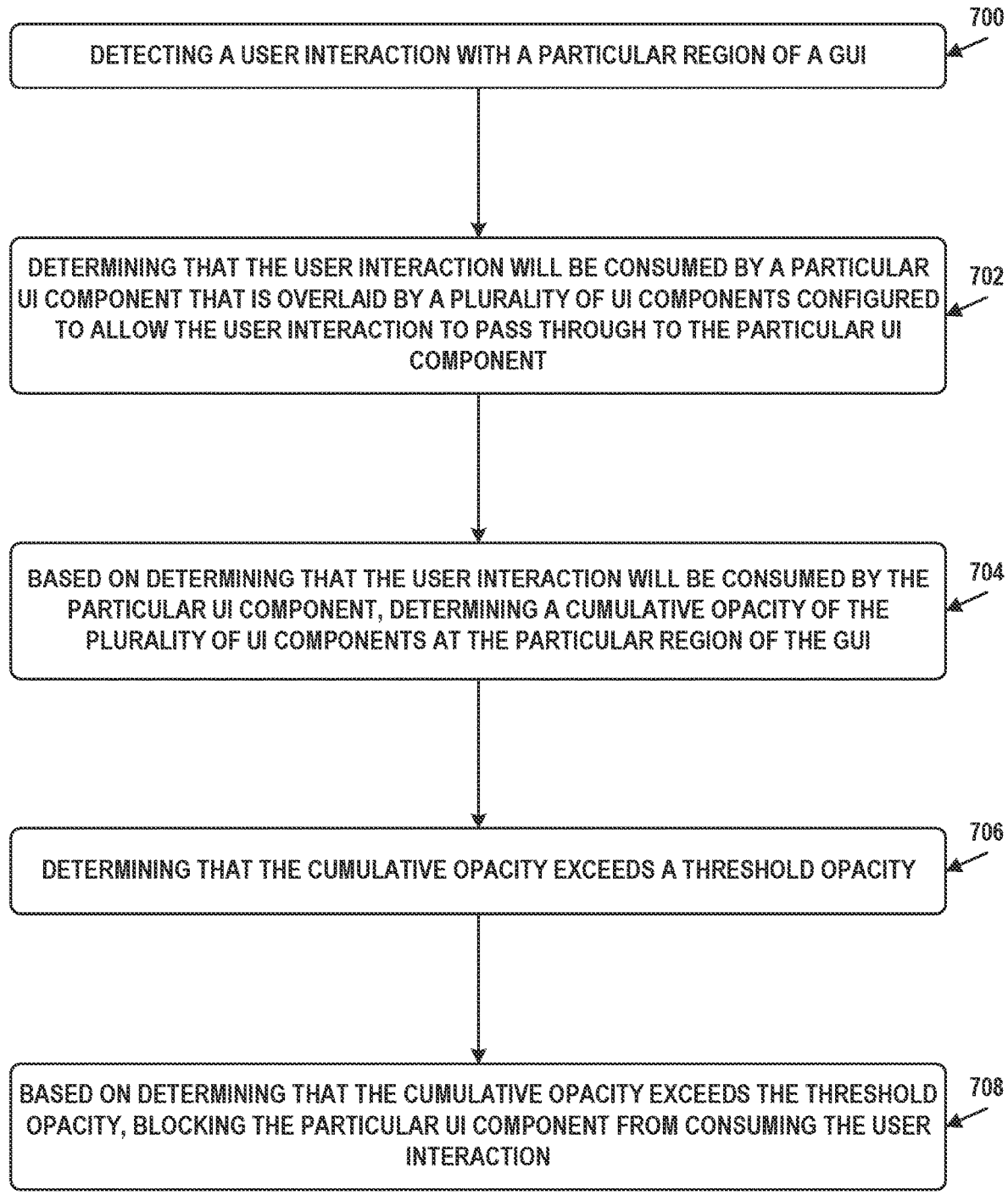
FIG. 7 illustrates a flow chart, in accordance with example embodiments.

FIG. 7 illustrates a flow chart of operations related to preventing tapjacking attacks. The operations may be carried out by computing device 100, computing system 200, and/or system 660, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 involves detecting a user interaction with a particular region of a GUI.

Block 702 involves determining that the user interaction will be consumed by a particular UI component that is overlaid by a plurality of UI components configured to allow the user interaction to pass through to the particular UI component.

Block 704 involves, based on determining that the user interaction will be consumed by the particular UI component, determining a cumulative opacity of the plurality of UI components at the particular region of the GUI.

Block 706 involves determining that the cumulative opacity exceeds a threshold opacity.

Block 708 involves, based on determining that the cumulative opacity exceeds the threshold opacity, blocking the particular UI component from consuming the user interaction.

In some embodiments, each respective UI component of the plurality of UI components may be associated with a corresponding opacity for the particular region of the GUI. Determining the cumulative opacity may include determining the cumulative opacity of the plurality of UI components at the particular region of the GUI based on the corresponding opacity of each respective UI component.

In some embodiments, the cumulative opacity of the plurality of UI components at the particular region of the GUI may differ from the corresponding opacity of each respective UI component.

In some embodiments, the corresponding opacity of the respective UI component may indicate a maximum opacity of contents of the respective UI component in the particular region of the GUI.

In some embodiments, the plurality of UI components may include (i) a first plurality of UI components generated by a first software application and (ii) a second plurality of UI components generated by a second software application. Determining the cumulative opacity of the plurality of UI components may include (i) determining a first application-specific cumulative opacity of the first plurality of UI components at the particular region of the GUI and (ii) determining a second application-specific cumulative opacity of the second plurality of UI components at the particular region of the GUI. Determining that the cumulative opacity exceeds the threshold opacity may include determining that at least one of the first application-specific cumulative opacity or the second application-specific cumulative opacity exceeds the threshold opacity.

In some embodiments, the plurality of UI components may include (i) a first plurality of UI components generated by a first software application and (ii) a second plurality of UI components generated by a second software application. Determining the cumulative opacity of the plurality of UI components may include determining an application-agnostic cumulative opacity, at the particular region of the GUI, of the first plurality of UI components and the second plurality of UI components. Determining that the cumulative opacity exceeds the threshold opacity may include determining that application-agnostic cumulative opacity exceeds the threshold opacity.

In some embodiments, the particular UI component may be generated by a third software application different from the first software application and the second software application.

In some embodiments, the corresponding opacity may range from a value of zero to a predetermined value. The value of zero may represent a minimum opacity and the predetermined value may represent a maximum opacity. Determining the cumulative opacity may include determining, for each respective UI component, a corresponding transparency based on a difference between (i) the predetermined value and (ii) the corresponding opacity of the respective UI component. Determining the cumulative opacity may also include determining a product of the corresponding transparencies of the plurality of UI components, and determining the cumulative opacity based on the product.

In some embodiments, the corresponding opacity may be represented as a corresponding transparency ranging from a value of zero to a predetermined value. The value of zero may represent a minimum transparency and the predetermined value may represent a maximum transparency. Determining the cumulative opacity may include determining a product of the corresponding transparencies of the plurality of UI components, and determining the cumulative opacity based on the product.

In some embodiments, determining the cumulative opacity based on the product may include determining a difference between (i) the predetermined value and (ii) the product, and determining the cumulative opacity based on the difference.

In some embodiments, the cumulative opacity may be represented as a cumulative transparency. The threshold opacity may be represented as a threshold transparency. Determining that the cumulative opacity exceeds the threshold opacity may include determining that the cumulative transparency is less than the threshold transparency.

In some embodiments, determining that the user interaction will be consumed by the particular UI component may include determining that each respective UI component of the plurality of UI components is associated with an attribute indicating that the respective UI component is configured to ignore the user interaction and allow the user interaction to pass through to a layer of the GUI underlying the respective UI component.

In some embodiments, the user interaction may include touching the particular region of the GUI by way of a touch interface of a mobile computing device.

In some embodiments, (i) the detecting of the user interaction, (ii) the determining that the user interaction will be consumed by the particular UI component, (iii) the determining of the cumulative opacity, (iv) the determining that the cumulative opacity exceeds the threshold opacity, and (iv) the blocking of the particular UI component from consuming the user interaction may each be performed by an operating system of a computing device independently of software applications executing on the computing device.

In some embodiments, the GUI may be provided by an operating system of a mobile computing device. The particular UI component and the plurality of UI components may each be generated by the operating system of the mobile computing device in response to a respective request from a corresponding software application executed by the mobile computing device.

In some embodiments, it may be determined, for each respective UI component of the plurality of UI components, that a type of the respective UI component is one of a predetermined number of types of UI components. It may also be determined, for each respective UI component, that the respective UI component is untrusted based on determining that the type of the respective UI component is one of the predetermined number of types of UI components. The cumulative opacity of the plurality of UI components may be determined further based on determining that each respective UI component is untrusted.

In some embodiments, the GUI may include a horizontal area and a plurality of vertically-stacked layers. The particular region of the GUI may include a subset of the horizontal area. Each respective UI component of the plurality of UI components may be disposed in a corresponding layer of the plurality of vertically-stacked layers.

In some embodiments, the GUI may be configured to display each respective UI component of the plurality of UI components in a fixed region of the GUI such that the respective UI component is not repositionable by way of user interactions.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    detecting a user interaction with a particular region of a graphical user interface (GUI);
    determining that the user interaction will be consumed by a particular user interface (UI) component that is overlaid by a plurality of UI components, wherein each respective UI component of the plurality of UI components is (i) configured to allow the user interaction to pass through to the particular UI component and (ii) associated with a corresponding opacity for the particular region of the GUI;
    based on determining that the user interaction will be consumed by the particular UI component, determining a cumulative opacity of the plurality of UI components at the particular region of the GUI based on the corresponding opacity of each respective UI component of the plurality of UI components;
    determining that the cumulative opacity exceeds a threshold opacity; and
    based on determining that the cumulative opacity exceeds the threshold opacity, blocking the particular UI component from consuming the user interaction.

2. The computer-implemented method of claim 1, wherein the cumulative opacity of the plurality of UI components at the particular region of the GUI differs from the corresponding opacity of each respective UI component.

3. The computer-implemented method of claim 1, wherein the corresponding opacity of the respective UI component indicates a maximum opacity of contents of the respective UI component in the particular region of the GUI.

4. The computer-implemented method of claim 1, wherein:
    the plurality of UI components comprises (i) a first plurality of UI components generated by a first software application and (ii) a second plurality of UI components generated by a second software application,
    determining the cumulative opacity of the plurality of UI components comprises (i) determining a first application-specific cumulative opacity of the first plurality of UI components at the particular region of the GUI and (ii) determining a second application-specific cumulative opacity of the second plurality of UI components at the particular region of the GUI, and
    determining that the cumulative opacity exceeds the threshold opacity comprises determining that at least one of the first application-specific cumulative opacity or the second application-specific cumulative opacity exceeds the threshold opacity.

5. The computer-implemented method of claim 4, wherein the particular UI component is generated by a third software application different from the first software application and the second software application.

6. The computer-implemented method of claim 1, wherein:
    the plurality of UI components comprises (i) a first plurality of UI components generated by a first software application and (ii) a second plurality of UI components generated by a second software application,
    determining the cumulative opacity of the plurality of UI components comprises determining an application-agnostic cumulative opacity, at the particular region of the GUI, of the first plurality of UI components and the second plurality of UI components, and
    determining that the cumulative opacity exceeds the threshold opacity comprises determining that the application-agnostic cumulative opacity exceeds the threshold opacity.

7. The computer-implemented method of claim 1, wherein the corresponding opacity ranges from a value of zero to a predetermined value, wherein the value of zero represents a minimum opacity and the predetermined value represents a maximum opacity, and wherein determining the cumulative opacity comprises:
    determining, for each respective UI component, a corresponding transparency based on a difference between (i) the predetermined value and (ii) the corresponding opacity of the respective UI component;
    determining a product of the corresponding transparencies of the plurality of UI components; and
    determining the cumulative opacity based on the product.

8. The computer-implemented method of claim 7, wherein determining the cumulative opacity based on the product comprises:
    determining a difference between (i) the predetermined value and (ii) the product; and
    determining the cumulative opacity based on the difference.

9. The computer-implemented method of claim 1, wherein the corresponding opacity is represented as a corresponding transparency ranging from a value of zero to a predetermined value, wherein the value of zero represents a minimum transparency and the predetermined value represents a maximum transparency, and wherein determining the cumulative opacity comprises:
    determining a product of the corresponding transparencies of the plurality of UI components; and
    determining the cumulative opacity based on the product.

10. The computer-implemented method of claim 1, wherein the cumulative opacity is represented as a cumulative transparency, wherein the threshold opacity is represented as a threshold transparency, and wherein determining that the cumulative opacity exceeds the threshold opacity comprises:
    determining that the cumulative transparency is less than the threshold transparency.

11. The computer-implemented method of claim 1, wherein determining that the user interaction will be consumed by the particular UI component comprises:
    determining that each respective UI component of the plurality of UI components is associated with an attribute indicating that the respective UI component is configured to ignore the user interaction and allow the user interaction to pass through to a layer of the GUI underlying the respective UI component.

12. The computer-implemented method of claim 1, wherein the user interaction comprises touching the particular region of the GUI by way of a touch interface of a mobile computing device.

13. The computer-implemented method of claim 1, wherein (i) the detecting of the user interaction, (ii) the determining that the user interaction will be consumed by the particular UI component, (iii) the determining of the cumulative opacity, (iv) the determining that the cumulative opacity exceeds the threshold opacity, and (iv) the blocking of the particular UI component from consuming the user interaction are each performed by an operating system of a computing device independently of software applications executing on the computing device.

14. The computer-implemented method of claim 1, wherein the GUI is provided by an operating system of a mobile computing device, and wherein the particular UI component and the plurality of UI components are each generated by the operating system of the mobile computing device in response to a respective request from a corresponding software application executed by the mobile computing device.

15. The computer-implemented method of claim 1, further comprising:
determining, for each respective UI component of the plurality of UI components, that a type of the respective UI component is one of a predetermined number of types of UI components;
determining, for each respective UI component, that the respective UI component is untrusted based on determining that the type of the respective UI component is one of the predetermined number of types of UI components; and
determining the cumulative opacity of the plurality of UI components further based on determining that each respective UI component is untrusted.

16. The computer-implemented method of claim 1, wherein the GUI comprises a horizontal area and a plurality of vertically-stacked layers, wherein the particular region of the GUI comprises a subset of the horizontal area, and wherein each respective UI component of the plurality of UI components is disposed in a corresponding layer of the plurality of vertically-stacked layers.

17. The computer-implemented method of claim 1, wherein the GUI is configured to display each respective UI component of the plurality of UI components in a fixed region of the GUI such that the respective UI component is not repositionable by way of user interactions.

18. A system comprising:
a processor; and
a non-transitory computer-readable medium having stored thereon instructions that, when executed by the processor, cause the processor to perform operations comprising:
detecting a user interaction with a particular region of a graphical user interface (GUI);
determining that the user interaction will be consumed by a particular user interface (UI) component that is overlaid by a plurality of UI components, wherein each respective UI component of the plurality of UI components is (i) configured to allow the user interaction to pass through to the particular UI component and (ii) associated with a corresponding opacity for the particular region of the GUI;
based on determining that the user interaction will be consumed by the particular UI component, determining a cumulative opacity of the plurality of UI components at the particular region of the GUI based on the corresponding opacity of each respective UI component of the plurality of UI components;
determining that the cumulative opacity exceeds a threshold opacity; and
based on determining that the cumulative opacity exceeds the threshold opacity, blocking the particular UI component from consuming the user interaction.

19. The system of claim 18, wherein:
the plurality of UI components comprises (i) a first plurality of UI components generated by a first software application and (ii) a second plurality of UI components generated by a second software application,
determining the cumulative opacity of the plurality of UI components comprises (i) determining a first application-specific cumulative opacity of the first plurality of UI components at the particular region of the GUI and (ii) determining a second application-specific cumulative opacity of the second plurality of UI components at the particular region of the GUI, and
determining that the cumulative opacity exceeds the threshold opacity comprises determining that at least one of the first application-specific cumulative opacity or the second application-specific cumulative opacity exceeds the threshold opacity.

20. An article of manufacture including a non-transitory computer-readable medium having stored thereon instructions that, when executed by a computing device, cause the computing device to perform operations comprising:
detecting a user interaction with a particular region of a graphical user interface (GUI);
determining that the user interaction will be consumed by a particular user interface (UI) component that is overlaid by a plurality of UI components, wherein each respective UI component of the plurality of UI components is (i) configured to allow the user interaction to pass through to the particular UI component and (ii) associated with a corresponding opacity for the particular region of the GUI;
based on determining that the user interaction will be consumed by the particular UI component, determining a cumulative opacity of the plurality of UI components at the particular region of the GUI based on the corresponding opacity of each respective UI component of the plurality of UI components;
determining that the cumulative opacity exceeds a threshold opacity; and
based on determining that the cumulative opacity exceeds the threshold opacity, blocking the particular UI component from consuming the user interaction.

* * * * *